July 14, 1936. H. A. DOUGLAS Re. 20,032

REFLECTING ELECTRIC LAMP

Original Filed Feb. 3, 1930 2 Sheets-Sheet 1

HARRY A. DOUGLAS
INVENTOR
BY Freeman and Weidman
ATTORNEYS

316

July 14, 1936. H. A. DOUGLAS Re. 20,032

REFLECTING ELECTRIC LAMP

Original Filed Feb. 3, 1930 2 Sheets-Sheet 2

HARRY A. DOUGLAS
INVENTOR
BY Freeman and Weidman
ATTORNEYS

Reissued July 14, 1936 Re. 20,032

UNITED STATES PATENT OFFICE 20,032

REFLECTING ELECTRIC LAMP

Harry A. Douglas, Bronson, Mich.

Original No. 1,876,877, dated September 13, 1932, Serial No. 425,547, February 3, 1930. Application for reissue March 17, 1934, Serial No. 716,206

25 Claims. (Cl. 173—339)

My invention relates to structures employing incandescent electric lamps and is particularly serviceable in connection with concave reflectors, though there are features of my invention whose use is not to be thus limited.

The principal object of my invention is to provide a new and improved means for enabling the assembly of an incandescent electric lamp with a mounting, and more particularly with a reflector. Another object is to provide new and improved means for positioning, and for holding in position, with a mounting or reflector, an incandescent electric lamp.

A further object is the provision of a construction in which the reflector, itself, is employed to receive the pressure that enables the assembly of the lamp and mounting or reflector, an arrangement which permits of direct assembly of the lamp and mounting or reflector.

Other objects will appear hereinafter as the description of the invention proceeds.

The novel features of the invention will fully appear from this specification and the accompanying drawings forming a part thereof and disclosing one embodiment of the invention, and all these novel features are intended to be pointed out in the claims.

In the drawings, Fig. 1 is a view illustrating one embodiment of my invention, the incandescent lamp being shown in elevation, while a socket means assembled therewith and a fragmentary portion of a mounting are shown in section;

Figure 1:
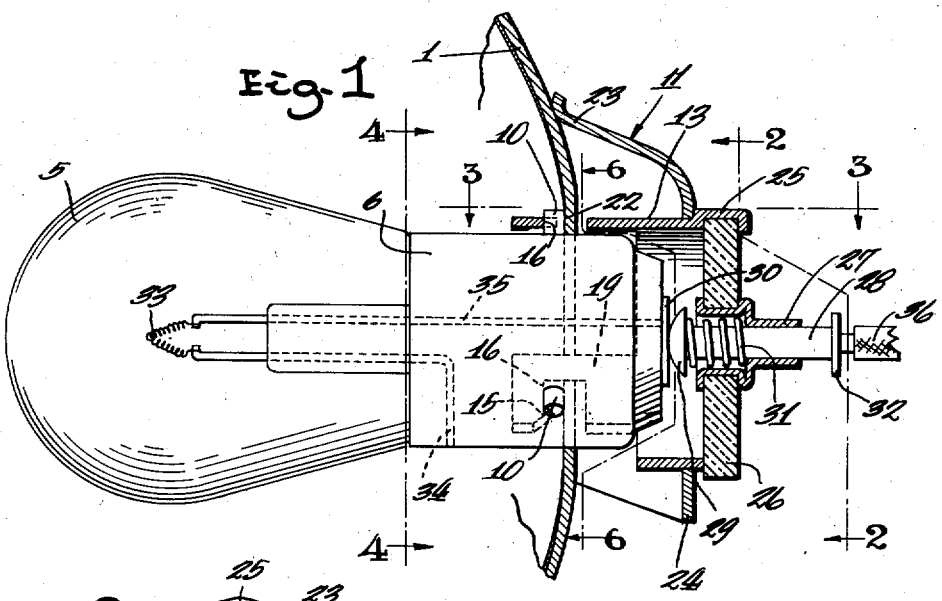
Figure 2:
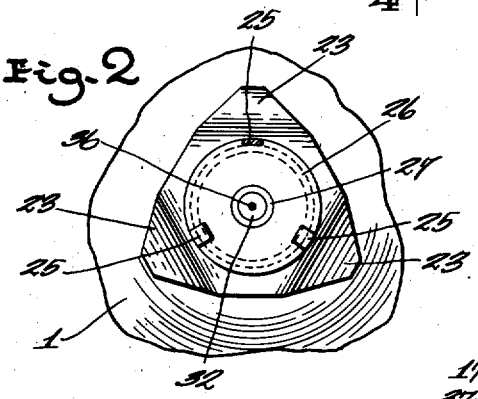
Fig. 2 is a sectional view on line 2—2 of Fig. 1.

The head lamp illustrated is inclusive of a parabolic reflector 1 whose parabolic reflecting face is covered by a light transmitting closure 2 which may be of glass. This closure is held against the front of the reflector by an assembling ring 3 which also serves to assemble the reflector with a concave lamp back 4. The construction of the peripheral rim portion of the reflector enabling the assembly of the reflector with the lamp back and the construction of the parts 3 and 4 may be of any well known or suitable character and form no novel parts in my present invention on which account further description of these parts need not be given.

In the embodiment of the invention illustrated an incandescent lamp 5 has a generally cylindrical lamp base 6. The reflector 1 has a primary circular opening 7 of substantially the diameter of the lamp base 6, which opening, when used, may surround the base in close proximity therewith. The reflector 1 also is provided with a plurality of auxiliary openings 8, 9, the purpose of which will appear. The auxiliary openings 8, 9 are in this case formed by locally extending the primary opening 7.

The lamp 5 is positioned and held in position with the reflector by means associated with the lamp and with the reflector. In this case the positioning means proper is associated with the base 6, which is laterally extended or enlarged. The lateral extension or enlargement of the base 6 is desirably in a plane perpendicular to the axis of the base, and may take the form of a plurality of projections or pins 10. The holding means in this instance includes a cage-like means 11.

The cage-like means 11 includes a shell portion 12 with which are associated axially extending spaced portions, in the form of bars or tongues 13.

The bars or tongues 13, in this case three in number, are adapted to be mounted with the reflector 1, by insertion through the respective auxiliary openings 8, 9, as will more fully appear.

The illustrated embodiment of my invention includes bayonet connection means between the lamp base 6 and the cage-like means 11. By way of illustration, that element of the bayonet connection means provided with a slot is, in this instance, carried by or forms a part of the cage-like means 11, whereas the element cooperating with the slotted element is carried by or forms a part of the lamp base. Accordingly, the bars 13 are provided with transversely extending slots or recesses 14. On one side or edge these slots are not rectilinear but are provided with shoulders 15, providing axially depressed seats 16. The approach to the top of the shoulders 15, from the open side of the slots 14 is desirably in the form of inclined planes 17.

The portion of the bayonet connection means, complementary to the slots 14, is, in this instance, provided by the lateral extension or enlargement on the lamp base 6, specifically in this instance the projections 10.

Figure 4:
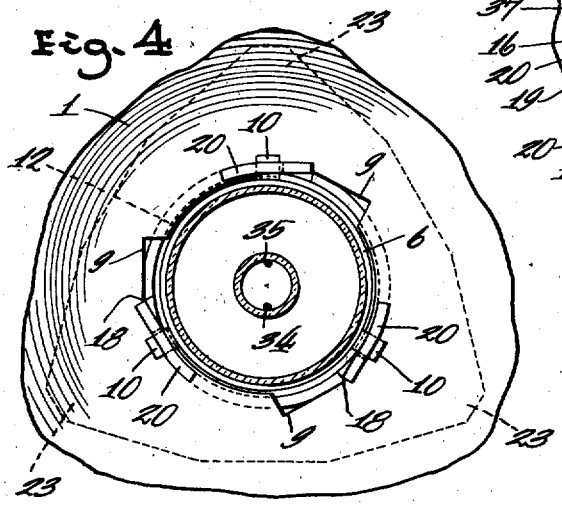
Fig. 4 is a sectional view on line 4—4 of Fig. 1.
Figure 5:
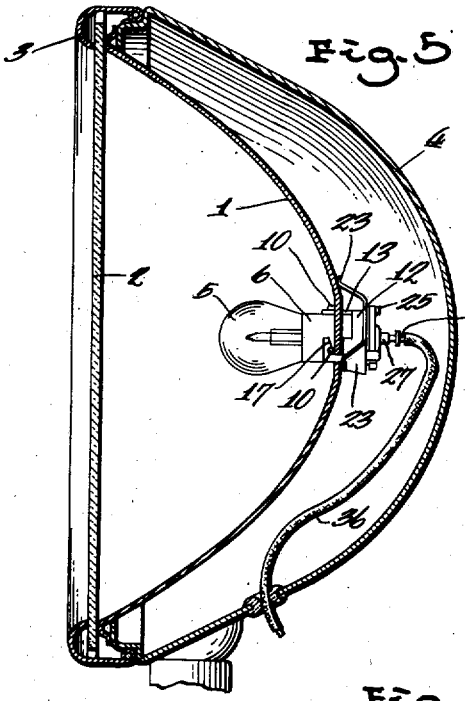
Fig. 5 is a sectional view of a complete automobile head lamp embodying the structure of my invention shown in Fig. 1.
Figure 6:
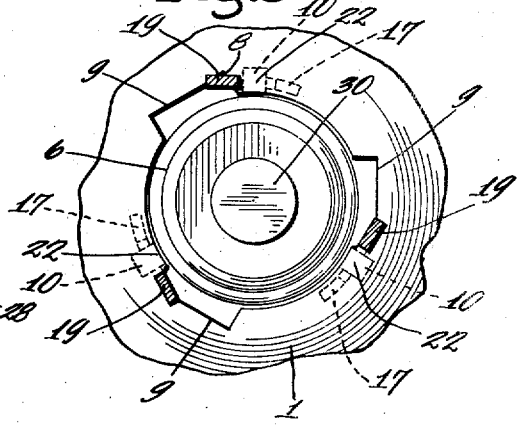
Fig. 6 is a sectional view on line 6—6 of Fig. 1.
Figure 7:
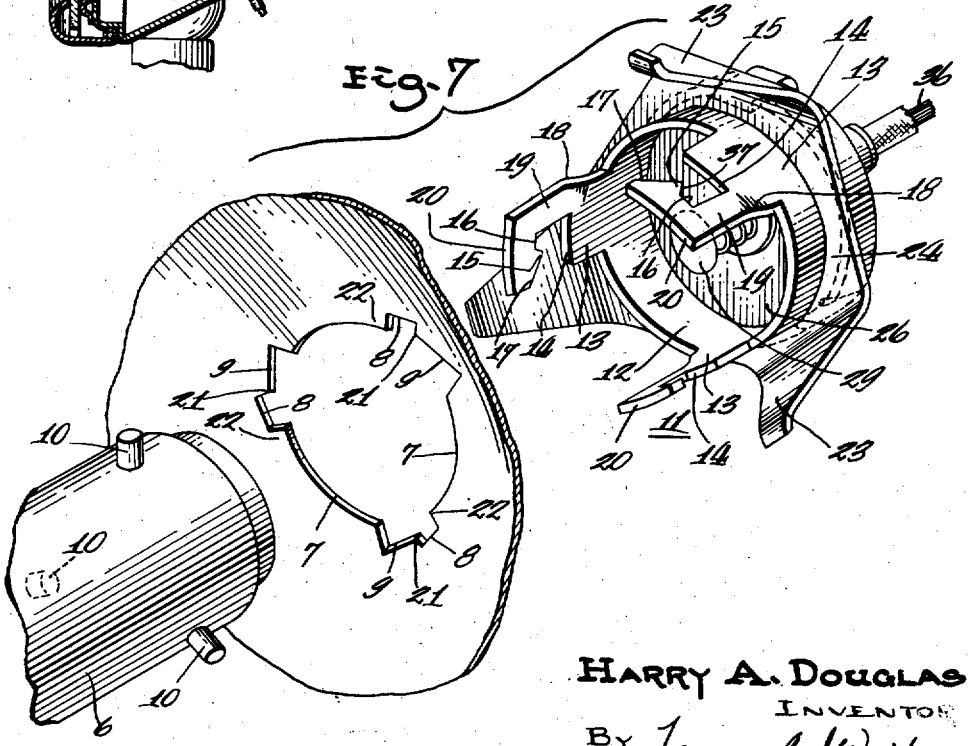
Fig. 7 is a perspective view illustrating some parts in separated relation.

The bars 13 of the cage-like means are desirably bent radially outwards along one axial edge 18, as can be seen most clearly in Figs. 4 and 7, so that the portions 19 so bent are in general planes approximately tangent to the inner peripheral locus of the cage-like means. The portions 19 are adapted to substantially register with the auxiliary openings 8.

In order that the bars 13 may be more readily mounted with the reflector, the auxiliary openings 9 are provided. These openings, which merge into the openings 8, have their radially outer edges formed to be substantially registrable with the bent portions 19 and are of sufficient peripheral width in conjunction with the openings 8 so that the axial ends 20 of the bars 13 may be inserted through said openings. When so inserted and then rotated in a counter-clockwise direction, as viewed in Fig. 7, the portions 19 are cammed radially inward until the trailing edges of the portions 19 clear the shoulders 21 formed at the junction between the auxiliary openings 8 and 9, whereupon the portions 19 snap radially outward into the openings 8, the bars 13 being desirably made of resilient material. When that position is assumed, the seats 16 overlie the portions 22 of the reflector. The portions 19 are axially slidable in the openings 8.

In the illustrated construction, the radially outer margins of the openings 8 are preferably equidistant from the reflector axis, so that the cage-like means when mounted with the reflector has its axis coincident with the axis of the reflector.

For the purpose of biasing the seats 16 toward the reflector, a resilient means is provided which in this case is mounted with the cage-like means 11 and comprises three elements here shown as three spaced leaf springs 23 which may be integrally associated with a central plate 24. The plate 24 has an opening large enough to permit the plate to be slipped over the shell portion 12. Motion of the plate 24, toward the right, as viewed in Fig. 1, may be limited by ears or enlargements 25 on the shell 12. The ends of springs 23 are based on the reflector.

The ears 25 may be bent radially inward to retain in position with the shell portion 12, a contact carrying insulating member 26. The member 26 may be a disc somewhat larger in diameter than the outside shell portion and provided with notches for cooperation with the ears 25. The member 26 has associated therewith a resilient means which comprises a stem or rod 28, slidable in the member 26, a sleeve 27 being desirably interposed. The resilient means proper is shown as a helical spring 31 provided with a sleeve, suitably mounted in said member, disposed about the stem 28 and interposed between a head 29 on the stem 28 and a shoulder on the sleeve 27. The movement of the head 29 under the bias of the spring 31 is suitably limited as by a collar 32 on the stem 28. The head 29 may serve as an electrical contact to contact with a contact 30 on the base of the lamp. The stem 28 may have a conductor 36 suitably connected thereto.

In the illustrated embodiment of the invention, the lamp 5 is a so-called single pole lamp whose filament 33 has one terminal connected by a conductor 34 with a metallic sheath that surrounds and forms a part of the lamp base 6. The other terminal of the lamp is connected by a conductor 35 with the contact 30, in this case upon the lamp axis.

Assuming that the cage-like means 11 has been mounted with the reflector 1 as hereinbefore described and as shown in Figs. 1 through 6, if it is desired to position a lamp 5 with the reflector 1, the lateral extension means on the lamp base is first so positioned and moved axially toward the reflector 1, against the bias of resilient means 31, that the pins 10 are opposite the open sides of the gaps between the inclined planes 17 and the reflector 1. The lamp is then rotated so that the pins 10 enter said gaps, the resulting cam action as between the pins 10 and the inclined planes 17 moving the bars 13 toward the left, as viewed in Fig. 3, against the bias of the resilient means 23, the biasing action of which is thus increased. When, in such rotative movement of the lamp, the pins 10 clear the shoulders 15, the seats 16 snap onto the pins 10, into the position shown in Fig. 3. It is evident that the lateral extension means on the lamp base thus will be pressed against and positioned from the reflector at three spaced points, desirably approximately 120° apart, registering with the pins 10. The positioning means thus provided insures the coincidence of the axes of the lamp and reflector, and also since the lighting center of the filament 33 is upon the lamp axis, the lighting center can be brought into coincidence with the focus of the reflector by suitable predetermination of the distance between the lighting center and the lateral extension means, specifically the pins 10.

Figure 3:
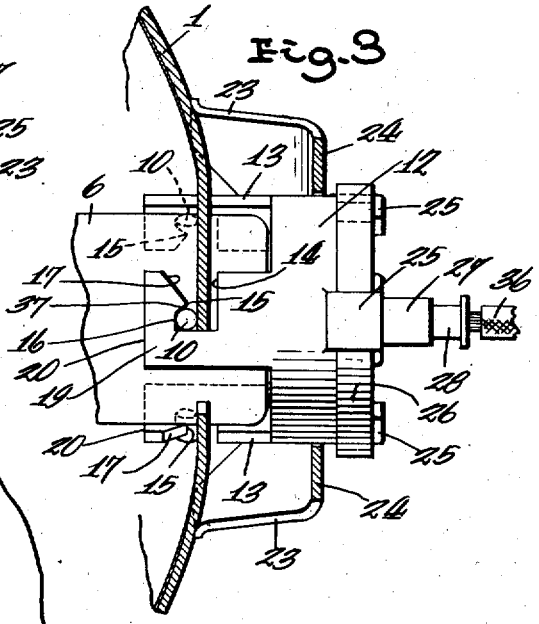
Fig. 3 is a sectional view on line 3—3 of Fig. 1.

It will be evident that the cage-like means 11 with its resilient means 23 serves not only to press the positioning means proper of the lamp into registry with a plurality of points associated with the reflector, spaced about the periphery of the lamp, to position the lamp from the reflector, but also serves, through the bars or tongues thereof, in cooperation with the lateral extension on the lamp base, to restrain movement of the lamp about its axis. In order that movement of the lamp about its axis may be restrained in the direction the reverse from that which takes place in assembling the lamp with the reflector, and at the same time permit ready intentional removal of the lamp, the approach to the tops of the shoulders 15, in a direction from the ends of the slots 14 toward their open ends may also be in the form of inclined planes 37, as indicated in Figs. 3 and 7.

It is further evident that the described construction is not only adapted to perform all of the functions of the usual socket means for incandescent electric lamps but that in this instance there is provided a slot-and-projection connection means which in its more specific aspects is jointly defined by the lamp base means, the reflector and the socket means. More specifically, the construction provides a bayonet slot or seat, or both, defined jointly by the reflector means and the socket means.

In view of the foregoing it will be apparent to those skilled in the art that the herein disclosed embodiment of my invention provides a new and improved lamp assembly, and accordingly accomplishes at least the principal object of my invention.

It also will be obvious to those skilled in the art that my invention may be embodied in other constructions wherein the means for positioning the lamp, and the means for holding it in position with the reflector, may assume a variety of forms, variously changed and modified within the spirit of the invention.

In general it will be clear to those skilled in the art that the features of my invention need not all be used in one embodiment such as the particular disclosed embodiment, and may be individually or collectively variously changed and modified, without departing from the spirit of the invention, or sacrificing the advantages thereof, and accordingly that the disclosure herein is illustrative only, and that my invention is not limited thereto.

I claim:

1. In combination: an incandescent electric lamp having a filament; a reflector for said lamp, presenting toward said filament a side having a reflecting surface; positioning means on the base of said lamp, for positioning said lamp relative to said reflector, constructed and arranged to bring said lamp and reflector into register at a plurality of spaced points disposed about the axis of said lamp at said side of said reflector; and means acting to press said positioning means and said reflector into register at said points, to position said lamp directly from said reflector.

2. In combination; an incandescent electric lamp having a filament; a reflector for said lamp, presenting toward said filament a side having a reflecting surface; positioning means on the base of said lamp, for positioning said lamp relative to said reflector, constructed and arranged to bring said lamp and reflector into register at a plurality of spaced points disposed about the axis of said lamp at said side of said reflector; pressing means, detachably mounted on said reflector, acting to press said positioning means and said reflector into register at said points, to position said lamp directly from said reflector; and means for releasably holding said pressing means in mounted position.

3. In combination: an incandescent electric lamp having a filament; a reflector for said lamp, presenting toward said filament a side having a reflecting surface; positioning means on the base of said lamp, for positioning said lamp relative to said reflector, constructed and arranged to bring said lamp and reflector into register at a plurality of spaced points disposed about the axis of said lamp at said side of said reflector; pressing means acting to press said positioning means and said reflector into register at said points, to position said lamp directly from said reflector; and means including a bayonet connection for connecting said pressing means to said mounting.

4. In combination: an incandescent electric lamp having a filament; a reflector for said lamp, presenting toward said filament a side having a reflecting surface; positioning means on the base of said lamp, for positioning said lamp relative to said reflector, constructed and arranged to bring said lamp and reflector into register at a plurality of spaced points disposed about the axis of said lamp at said side of said reflector; pressing means acting to press said positioning means and said reflector into register at said points, to position said lamp directly from said reflector; means including a bayonet connection for connecting said pressing means to said mounting; and means for latching said bayonet connection against unseating rotation.

5. In combination: an incandescent electric lamp having a filament; a reflector for said lamp, presenting toward said filament a side having a reflecting surface; positioning means for said lamp adapted to bring said lamp and reflector into register at a plurality of spaced points disposed about the axis of said lamp at said side of said reflector; and means acting to press said positioning means and said reflector into register, at said points, to position said lamp directly from said reflector; said last named means having portions spaced from said axis and from each other, extending in the general direction of said axis, mounted with and disposed through said reflector.

6. In combination: an incandescent electric lamp, having a filament and a base; a reflector for said lamp, provided with an aperture; said reflector presenting toward said filament a side having a reflecting surface, said base having a body, and having positioning means extending laterally from said body and adapted to abut said reflector at a plurality of points spaced about the periphery of said aperture at said side of said reflector; and socket means for said lamp, mounted with said reflector, in alinement with said aperture, and engaging said base; said socket means comprising resilient means, and said resilient means acting to press a portion of said socket means against said positioning means to thereby press said positioning means and said reflector into abutment at said points, to position said lamp directly from said reflector.

7. In combination: an incandescent lamp having a filament; a reflector for said lamp, presenting toward said filament a side having a reflecting surface; said lamp having positioning means adapted to register with said reflector at a plurality of spaced points disposed about the axis of said lamp at said side of said reflector; means, mounted with said reflector, for cooperation with said positioning means, to restrain movement of said lamp about its axis and means acting to press said positioning means and said reflector into register, at said points.

8. In combination: an incandescent electric lamp whose base is laterally enlarged; a mounting therefor; socket means for said base; said lateral enlargement being between and in engagement with a portion of said socket means and said mounting; resilient means, acting through the intermediation of said socket means, to press said lateral enlargement against said mounting; and means whereby rotation of said base causes an increase in the bias of said resilient means.

9. The combination with an incandescent lamp whose base has a lateral bayonet projection; of a mounting therefor; a socket receiving the base of said lamp and having a bayonet recess that receives said bayonet projection, said mounting being positioned to be also engaged by said projection which is interposed between said mounting and seat; and a spring pressing the socket upon said bayonet projection, and through the intermediation of the socket, pressing the bayonet projection against said mounting.

10. The combination with an incandescent lamp the center of whose lighting filament is upon the lamp axis and the base of which lamp has three bayonet projections in a plane that is perpendicular to the lamp axis; of a parabolic reflector; a socket receiving the base of said lamp and positioned by the reflector to bring the socket into coincidence with the reflector axis, the bayonet projections on the lamp base being received in bayonet seats in the socket and between these seats and reflector; and a spring carried by the socket pressing the socket upon the bayonet projections of the lamp base and through the intermediation of the socket pressing these projections against said reflector, the spring engaging the reflector at at least three places around the axis of the reflector.

11. The combination with an incandescent lamp, the center of whose lighting filament is upon the lamp axis and the base of which lamp is laterally enlarged at at least three places spaced around the axis of the base in a plane perpendicular to the lamp axis, of a parabolic reflector, a socket receiving the base of said lamp, the lateral enlargements of the lamp base being between a portion of the socket and said reflector, and a spring carried by the socket pressing the socket upon the lateral enlargements of the lamp base and through the intermediation of the socket, pressing the lateral enlargements of the lamp base against the reflector, the spring engaging the reflector at at least three places spaced apart around the axis of the lamp base.

12. The combination with an incandescent lamp whose base is laterally enlarged; of a mounting therefor; a socket receiving the base of said lamp, the lateral enlargement of the lamp base being between a portion of the socket and said mounting; and a spring pressing the socket upon the lateral enlargement of the lamp base and, through the intermediation of the socket, pressing the lateral enlargement of the lamp base against said mounting.

13. In combination: an incandescent electric lamp having a base; a mounting for said lamp; and means for connecting said lamp to said mounting including, a lateral extension on said base, engaging means for engaging said lateral extension, and resilient means acting to press said engaging means against said lateral extension to press said lateral extension against said mounting.

14. In combination: an incandescent electric lamp having a base; a mounting for said lamp; and means for connecting said lamp to said mounting including, a lateral extension on said base, means, having portions disposed through said mounting, engaging said lateral extension with said portions and resilient means acting to press said portions against said lateral extension to press said lateral extension against said mounting.

15. In combination: an incandescent electric lamp having a base; a mounting for said lamp; and means for connecting said lamp to said mounting including, a lateral extension on said base, engaging means for engaging said lateral extension, said lateral extension being insertable between a portion of said engaging means and said mounting, said portion of said engaging means, before said insertion of said lateral extension, being at a lesser distance from said mounting than the thickness of said lateral extension, means acting to bias said portion of said engaging means toward said mounting; and means whereby rotation of said base to connect said lamp to said mounting causes said portion to move away from said mounting to permit said insertion of said lateral extension.

16. In combination: an incandescent electric lamp having a base; a mounting for said lamp; and means for connecting said lamp to said mounting including, a lateral extension on said base, engaging means for engaging said lateral extension, biasing means acting to press said engaging means against said lateral extension to press said lateral extension against said mounting, and means whereby rotation of said lateral extension about the axis of said lamp causes increase in the bias of said biasing means.

17. In combination: an incandescent electric lamp having a base; a mounting for said lamp; and means for connecting said lamp to said mounting including, a lateral extension on said base, engaging means for engaging said lateral extension, said engaging means being movable with respect to said mounting, biasing means acting to press said engaging means against said lateral extension to press said lateral extension against said mounting, and means whereby rotation of said lateral extension about the axis of said lamp causes said engaging means to move away from said mounting.

18. In combination: an incandescent electric lamp having a base; a mounting for said lamp; and means for connecting said lamp to said mounting including, a lateral extension on said base, engaging means for engaging said lateral extension, said lateral extension being insertable between a portion of said engaging means and said mounting, said portion of said engaging means, after said insertion of said lateral extension, being at a lesser distance from said mounting than during the insertion of said lateral extension, means acting to bias said portion of said engaging means toward said mounting; and means whereby rotation of said base to disconnect said lamp from said mounting causes said portion to move away from said mounting to permit withdrawal of said lateral extension from between said engaging means and said mounting.

19. In combination: an incandescent electric lamp having a base; a mounting for said lamp; means for connecting said lamp to said mounting including, a lateral extension on said base, engaging means for engaging said lateral extension, resilient means acting to press said engaging means against said lateral extension to press said lateral extension against said mounting, said engaging means and said resilient means comprising a unit detachably mounted on said mounting, and means for releasably holding said unit in mounted position.

20. In combination: an incandescent electric lamp having a base; a mounting for said lamp; means for connecting said lamp to said mounting including, a lateral extension on said base, engaging means for engaging said lateral extension, resilient means acting to press said engaging means against said lateral extension to press said lateral extension against said mounting, said engaging means and said resilient means comprising a unit, and means including a bayonet connection for connecting said unit to said mounting.

21. In combination: an incandescent electric lamp having a base; a mounting for said lamp; means for connecting said lamp to said mounting including, a lateral extension on said base, engaging means for engaging said lateral extension, resilient means acting to press said engaging means against said lateral extension to press said lateral extension against said mounting, said engaging means and said resilient means comprising a unit, means including a bayonet connection for connecting said unit to said mounting, and means for latching said bayonet connection against unseating rotation.

22. In combination: an incandescent lamp, having a base; a reflector for said lamp, provided with an aperture, in alinement with said base; said reflector being provided with a plurality of auxiliary apertures disposed about the axis of said base; said base having means adapted to position said lamp in a predetermined position; means having portions disposed through said auxiliary apertures and adapted to engage said positioning means with said portions; and resilient means acting to press said portions in a direction toward said reflector against said positioning means, to thereby press said positioning means against said reflector.

23. In combination: an incandescent electric lamp, having a base; a reflector for said lamp; said base having laterally extending positioning means, adapted to register with said reflector; pressing means detachably mounted with said reflector, said pressing means having parts overlying said positioning means and constructed and arranged to press against said positioning means; and resilient means constructed and arranged to cause said parts to press said positioning means into said register.

24. In combination: an incandescent electric lamp, having a filament and a base; a reflector for said lamp, presenting toward said filament a side having a reflecting surface; said base having laterally extending positioning means, adapted to register with said reflector at said side of said reflector; pressing means adapted to press against said positioning means; one of said means being provided with bayonet slot means and the other with projection means adapted to cooperate with said slot means; and resilient means constructed and arranged to cause said pressing means to press said positioning means into said register.

25. In combination: an incandescent electric lamp; a mounting; socket means and base means for said lamp, said socket means and base means being constructed and arranged for bayonet connection with each other, one of said means being provided with one of the elements of said bayonet connection and the other of said means being provided with the complementary element of said bayonet connection; said mounting being positioned to be engaged by the base means element of said bayonet connection; and resilient means constructed and arranged to press the socket means element of said bayonet connection against the base means element of said connection, thereby to press said base means element against said mounting.

HARRY A. DOUGLAS.